W. WALTERS.
Car-Wheels.

No. 150,447. Patented May 5, 1874.

Witnesses.
A. H. Norris,
Wm J. Payton

Inventor.
Wm Walters
Per James L. Norris
Atty.

UNITED STATES PATENT OFFICE.

WILLIAM WALTERS, OF TAMAQUA, PENNSYLVANIA.

IMPROVEMENT IN CAR-WHEELS.

Specification forming part of Letters Patent No. 150,447, dated May 5, 1874; application filed May 24, 1873.

*To all whom it may concern:*

Be it known that I, WILLIAM WALTERS, of Tamaqua, in the county of Schuylkill and State of Pennsylvania, have invented a new and useful Improvement in Car-Wheels, of which the following is a specification:

This invention relates to improvements in car-wheels which turn loosely upon their axles or journals, and it has for its object to provide means whereby friction is lessened to a great extent, and the wear of the hub bore or box is prevented to a great extent. The invention consists in constructing a cast-metal car-wheel with a hub the bore or axle-box of which is chilled or hardened so as to prevent wear, while friction is lessened to a considerable extent by inserting lining-strips of anti-friction metal or other material into dovetail grooves formed in the hub-bore.

Figure 1:
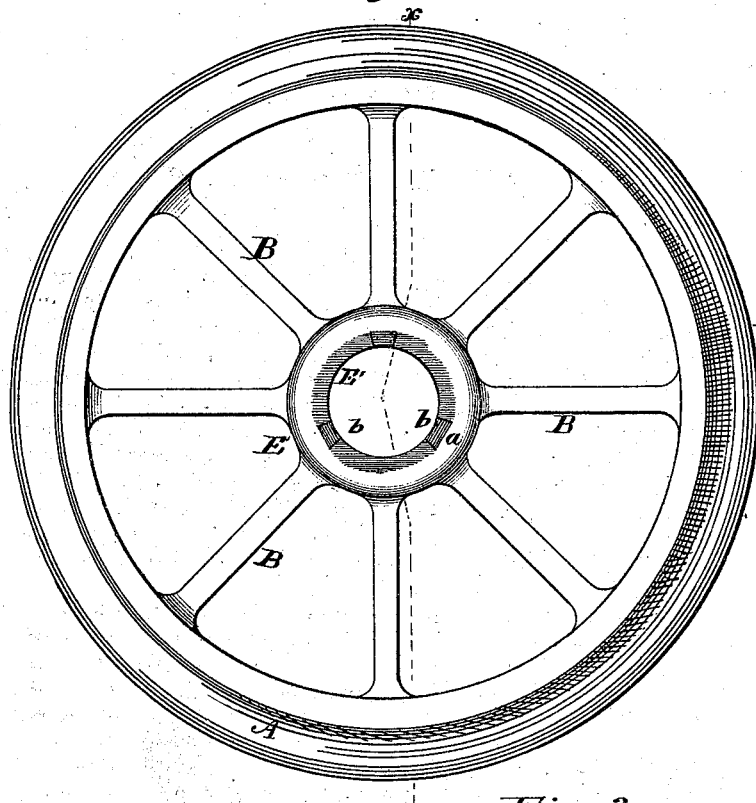
Figure 2:
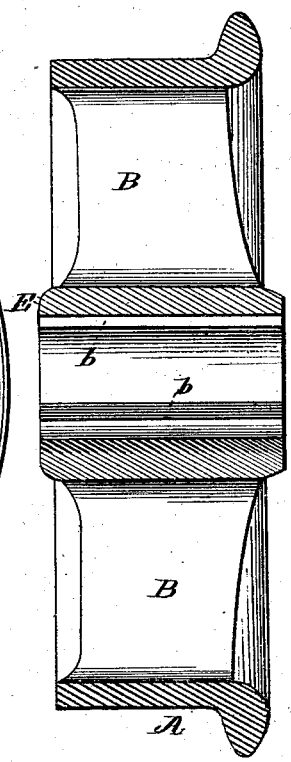
Figure 3:
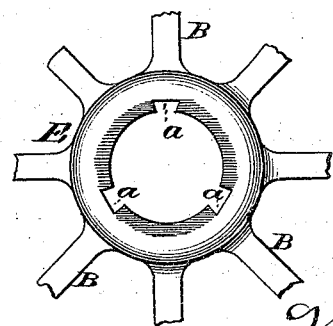

In the accompanying drawings, Figure 1 is a side elevation of a car-wheel constructed according to my invention. Fig. 2 is a vertical section taken through the line $xx$ of Fig. 1. Fig. 3 is a detail view of the hub with the lining-strips removed.

The wheel which forms the subject of the present invention is designed to be mounted loosely upon its axle or journal so as to turn thereon, and it is constructed in the ordinary manner or form, being composed of the tread A, spokes B, and hub E; or, instead of the spokes, a plate or web may be employed. The axial bore or axle-box of the wheel is chilled or hardened, as shown at E′, so as to produce a hard surface which is capable of retaining its original form or shape, notwithstanding the wear to which the wheel is subjected.

In order to decrease friction to a minimum I propose to insert into dovetail grooves $a$, made in the hub-bore or axle-box, lining-strips $b$, of babbitt-metal or other anti-friction material. The lining-strips, applied as shown, will prevent the heating of the journal, and, as they are removable, effectual provision is made for replacing the same, when worn out, by new ones.

A wheel constructed as above described, with a chilled or hardened hub-bore, and with lining-strips of a softer material inserted therein, is superior in many respects to wheels which are provided with a chilled hub-bore, as the latter have been found to be too hard, causing a grinding action upon the journal, and, consequently, the reduction of the same in a comparatively short space of time.

Having thus fully described my invention, I claim—

A vehicle-wheel the bore of which is chilled or hardened, and having combined therewith the strips $b$, placed in dovetailed grooves, substantially as shown and described.

WILLIAM WALTERS.

Witnesses:
  MICHAEL BEARD,
  J. H. LUTZ.